(12) United States Patent
Hidai

(10) Patent No.: US 7,184,045 B2
(45) Date of Patent: Feb. 27, 2007

(54) IMAGE PROCESSING APPARATUS, DISPLAY APPARATUS WITH TOUCH PANEL, IMAGE PROCESSING METHOD AND COMPUTER PROGRAM

(75) Inventor: Hideo Hidai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 333 days.

(21) Appl. No.: 10/243,690

(22) Filed: Sep. 16, 2002

(65) Prior Publication Data

US 2003/0052922 A1    Mar. 20, 2003

(30) Foreign Application Priority Data

Sep. 14, 2001 (JP) .............................. 2001-279832
Sep. 11, 2002 (JP) .............................. 2002-266058

(51) Int. Cl.
*G06T 11/20* (2006.01)

(52) U.S. Cl. ...................... 345/441; 345/443; 345/798; 345/799; 345/800; 345/794; 345/173

(58) Field of Classification Search ................ 345/441, 345/798, 799, 781, 800, 794, 443, 173
See application file for complete search history.

(56) References Cited

U.S. PATENT DOCUMENTS 5,150,432 A * 9/1992 Ueno et al. .................. 382/250
5,923,314 A * 7/1999 Seto et al. ................... 345/641
6,614,470 B1 * 9/2003 Manowitz et al. ......... 348/211.2
6,636,244 B1 * 10/2003 Kelley et al. ................ 345/781

FOREIGN PATENT DOCUMENTS

| JP | 57-211637 | 12/1982 |
|----|-----------|---------|
| JP | 9-91094   | 4/1997  |
| JP | 11-110116 | 4/1999  |
| JP | 2000-284895 | 10/2000 |

\* cited by examiner

Primary Examiner—Kee M. Tung
Assistant Examiner—Tam Tran
(74) *Attorney, Agent, or Firm*—Oblon, Spivak, McClelland, Maier & Neustadt, P.C.

(57) ABSTRACT

An image processing apparatus comprises: a boundary line designating unit which designates a boundary line for dividing a screen into a plurality of regions; and a region selecting unit which selects either one of the inside and the outside of the boundary line designated by the boundary line designator as a region to be processed in which an image is to be processed. The boundary line designating unit designates a region surrounded by a freehand line input via an inputting unit. As a result, it is possible to easily and accurately designate a region which a user desires to subject to an image processing, so as to readily subject the desired region to the image processing.

16 Claims, 14 Drawing Sheets

|  | $X_1$ | $X_2$ |
|---|---|---|
| $Y_{max}$ | $X_{max1}$ | $X_{max2}$ |
| ⇩ | | |
| $Y_A$ | $X_{A1}$ | $X_{A2}$ |
| ⇩ | | |
| $Y_{min}$ | $X_{min1}$ | $X_{min2}$ |

IMAGE PROCESSING APPARATUS, DISPLAY APPARATUS WITH TOUCH PANEL, IMAGE PROCESSING METHOD AND COMPUTER PROGRAM

BACKGROUND OF THE INVENTION

1) Field of the Invention

The present invention relates to an image processing apparatus, a display apparatus with a touch panel, an image processing method and a program for allowing a computer to execute the image processing method.

2) Description of the Related Art

In an information processing apparatus such as a personal computer, there has been conventionally provided a processing function that a rectangular region, for example, is designated on a screen, on which an image, a character or the like is displayed, and then, an image inside of the designated region (i.e., inside of the surrounded region) or the like is cut or copied. A point of an upper left corner in a region to be designated is designated by depressing a button by the use of, for example, a mouse, and then, a point of a lower right corner is designated by dragging the mouse in the depressed state, thereby designating the rectangular region.

The region which can be designated may be not only a rectangular region but also a closed region having a free shape formed by a freehand line (a free curve) drawn freehand. For example, a controller in a personal computer body gains momentarily variable coordinates, which are input into the personal computer body through a mouse when the mouse is moved while depressing the button of the mouse, and thus, a freehand line is drawn on a screen based on the coordinates.

In the prior art, not only the mouse but also a touch panel or the like, which is provided as a display apparatus with coordinate an input unit, can be used as a coordinate input device for designating the region on a screen.

For example, a plasma hand writing system available from Pioneer Corp. is one of electronic whiteboard systems which use a display apparatus with coordinate an input unit. This system includes an interface which emulates a mouse interface for the Windows as an operating system widely used in a personal computer, and therefore, enables direct handwriting on a screen by a finger or with a special electronic pen, and further, enables a basic operation of a general-purpose application provided based on the Windows in the personal computer to be performed without any mouse. That is to say, like in the personal computer using the mouse, a freehand line can be drawn on a screen by a finger, and thus, the inside surrounded by the line can be designated as a region to be processed.

There have been known coordinate inputting/detecting devices for the display device with a coordinate inputting function explained below.

In a first example, wires are disposed in a grid manner in an X-Y direction on a coordinate inputting plane, and the coordinates of a position to which a special pen approaches are detected by varying a current flowing in the wires by the use of the special pen for generating a magnetic field.

In a second example, a coordinate inputting plane is formed of a resistant film made of a conductive rubber. When a desired position is designated by bringing a pen into contact with the coordinate inputting plane, a resistance at the position on the coordinate inputting plane is varied according to pressure. Consequently, the coordinates at the position can be detected by detecting the resistance.

In a third example, light beams are emitted from two light emitters through a rotary polygonal mirror, to scan a coordinate inputting plane, and then, a pen inserting position is detected by detecting light beams reflected on a reflecting member attached to the tip of a pen by two light receivers (see Japanese Patent Application Laid-Open No. 57-211637). The two light receivers receive the light beams, and then, calculate the coordinates of the designated position by utilizing the principle of triangulation. Here, the coordinate inputting plane in the coordinate inputting/detecting device is not a physical plane such as the coordinate inputting plane in the coordinate inputting/detecting devices in the first and second examples, but a plane defined by the light beams emitted from the light beam emitters.

In addition to the Japanese Patent Application Laid-Open No. 57-211637, the prior art disclosed in Japanese Patent Application Laid-Open No. 9-91094 also is an optical coordinate inputting/detecting device, like the third example. In this prior art, light emitters/receivers are disposed at, for example, lower right and left corners on a coordinate inputting plane, and then, light beams are emitted from the light emitters/receivers, respectively, while varying an emitting direction (i.e., an emitting angle), to scan the coordinate inputting plane. Thereafter, the light beams are refracted (that is, reflected in a return direction) by corner cube arrays (i.e., optical reflexive reflecting unit) disposed on upper, right and left sides of a panel, and then, the light beams returned by the light emitters/receivers, respectively, are detected. As a consequence, the scanning angle of each of the light beams cut off by a finger or the like, by the right and left light emitters/receivers can be detected, and thus, the coordinates of a designated position can be calculated by utilizing the principle of the triangulation.

The prior art disclosed in Japanese Patent Application Laid-Open No. 11-110116 also is one of the optical coordinate inputting/detecting devices explained as the third example. In this prior art, light emitters/receivers are disposed at, for example, upper right and left corners on a coordinate input-plane, and then, light beams are emitted from the light emitters/receivers, respectively, while varying emitting directions (i.e., emitting angles), to scan the coordinate inputting plane. Thereafter, the light beams are refracted (that is, reflected in return directions) by an optical reflexive reflecting unit disposed on lower, right and left sides of a panel, and then, the light beams returned by the respective light emitters/receivers are detected. As a consequence, a light beam cutting-off range of the scanning angle of each of the light beams cut off by a finger or the like, by the right and left light emitters/receivers can be detected, and thus, the coordinates of a designated position can be calculated.

The prior art disclosed in Japanese Patent Application Laid-Open No. 2000-284895 also is one of the optical coordinate inputting/detecting devices explained as the third example. When the coordinates of a designated position are detected by an infrared beam in the same manner, the position can be stably detected even if a display plate is distorted or a coordinate inputting pen is inclined.

However, in the prior art, only the inside region surrounded by the freehand line on the screen can be designated as a region to be processed. Furthermore, if a part of an image intended to be included in the region to be processed is displayed outside of the region to be processed, the region displayed outside is excluded from the region to be processed, thereby arising a problem that the region displayed outside remains not processed.

SUMMARY OF THE INVENTION

It is an object of this invention to provide an image processing method in which a region intended to be subjected to image processing by a user can be easily designated with high accuracy, and therefore, the image processing with respect to a desired region can be readily performed.

According to one aspect of the present invention, there is provided an image processing apparatus comprising, a boundary line designating unit which designates a boundary line for dividing a screen into a plurality of regions, and a region selecting unit which selects either one of the inside and the outside of the boundary line designated by the boundary line designating unit as a region to be processed in which an image is to be processed.

According to the above aspect, either one of the inside and the outside of a predetermined region on the screen can be selected as the region to be processed. Consequently, when, for example, the region to be processed is wide, a region except for the region to be processed is designated, and then, the wide region to be processed can be designated by selecting the residual region. In this manner, it is possible to designate a desired region with ease, so as to readily subject the desired region to image processing.

According to another aspect of the present invention, there is provided a display apparatus with a touch panel which controls an image displayed on a screen, the display apparatus with a touch panel comprising, a boundary line designating unit which designates a boundary line for dividing the screen into regions based on the coordinates of a position input by the use of a touch panel, and a region selecting unit which selects the inside or the outside of the boundary line designated by the boundary line designating unit as a region to be processed in which an image is to be processed.

According to still another aspect of the present invention, there is provided an image processing method in which an image displayed on a screen is processed, the image processing method comprising steps of, designating a boundary line which divides the screen into regions, and selecting the inside or the outside of the boundary line designated at the region designating step as a region to be processed in which an image is to be processed.

According to still another aspect of the present invention, there is provided a program for allowing a computer to execute an image processing by which an image displayed on a screen is processed, the program for allowing a computer to execute steps of, designating a boundary line which divides the screen into regions, and selecting the inside or the outside of the boundary line designated at the region designating step as a region to be processed in which an image is to be processed.

These and other objects, features and advantages of the present invention are specifically set forth in or will become apparent from the following detailed descriptions of the invention when read in conjunction with the accompanying drawings.

DETAILED DESCRIPTIONS

The present invention relates to an image processing apparatus, a display apparatus with a touch panel, an image processing method and a program for allowing a computer to execute the method. In particular, the present invention relates to a method for designating a region inside of a screen, in which a region to be processed inside of a screen is designated by forming a freehand line on the screen by inputting the coordinates of a position designated on the screen, and then, forming the region inside of the screen surrounded by the freehand line in a system using an information processing apparatus such as a personal computer or a display apparatus with coordinate an input unit.

An image processing apparatus, a display apparatus with a touch panel, an image processing method and a program for allowing a computer to execute the image processing method in the preferred embodiment according to the present invention will be explained in detail below in reference to the accompanying drawings.

Figure 1:
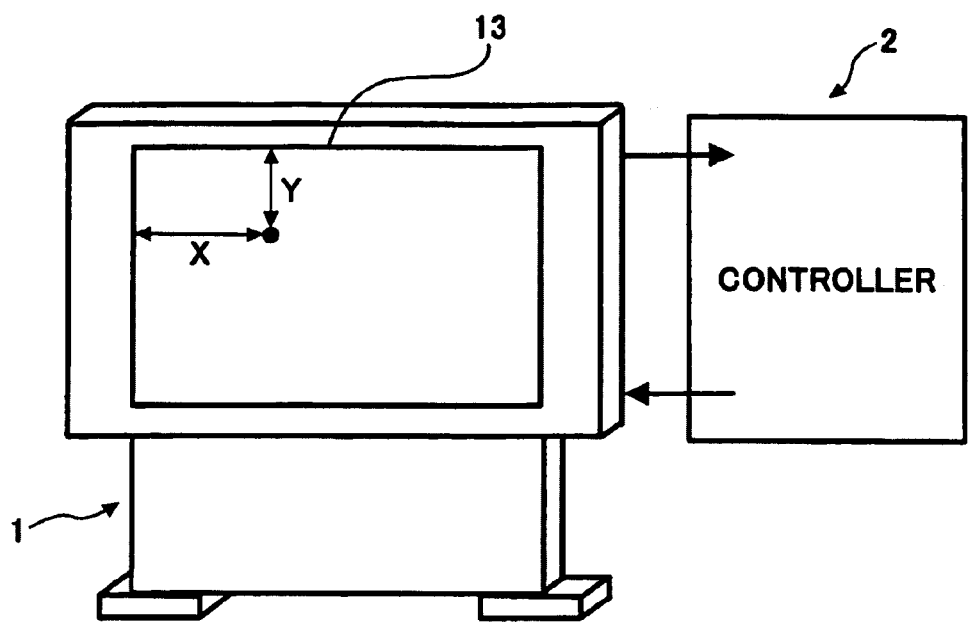
FIG. 1 is a diagram which shows the configuration of an electronic whiteboard system.

FIG. 1 is a diagram which shows the configuration of an electronic whiteboard system 3 as one example of a display apparatus with a touch panel in one preferred embodiment. As shown, the electronic whiteboard system 3 in the present preferred embodiment comprises a display apparatus 1 with a coordinate inputting function and a controller 2.

The controller 2 is realized by, for example, a personal computer or the like. The display apparatus 1 with a coordinate inputting function is provided with a coordinate detector, described later, which optically detects a position on a screen 13 serving as a touch panel, touched by a user with his or her finger or the like so as to transmit the detection result to the controller 2, and a display processor, described later, which displays image data transmitted from the controller 2. The coordinate detector detects X and Y coordinates on a display screen according to the resolution of the display screen (for example, the dot number in an X-axial direction, 1024, and the dot number in a Y-axial direction, 768), and then, transmits the coordinate data to the controller 2. Here, the screen 13 serving as the touch panel is one example of an input accepting unit according to the present invention.

Figure 2:
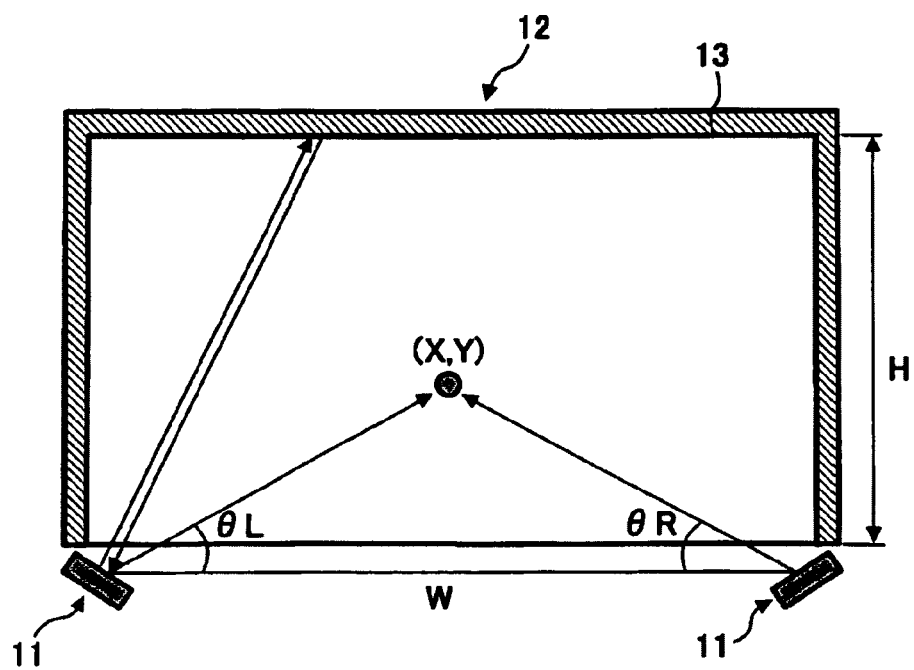
FIG. 2 is a diagram explanatory of main parts of a display device with a coordinate input function.

The coordinate detector in the display apparatus 1 with a coordinate inputting function will be explained in reference to FIG. 2. As shown in FIG. 2, the coordinate detector 4 includes light beam emission detectors 11 arranged at lower right and left corners of the screen 13, respectively, and a light beam reflecting film 12 disposed at upper, right and left edges of the screen 13 in such a manner as to surround the screen 13. The light beam emission detector 11 emits an irradiation light beam. More specifically, the light beam emission detector 11 has a polygonal rotating member, not shown. The emission is continued while varying the emission direction of the irradiation light beam by rotating the polygonal rotating member, so that the entire screen 13 is scanned. The light beam reflecting film 12 has a configuration known to one skilled in the prior art. Namely, the light beam reflecting film 12 is adapted to (reflexively) reflect the irradiation light beam emitted from the light beam emission detector 11 in a direction in which the irradiation light beam is incident. And then, the light beam emission detector 11 detects the reflected light beam of the irradiation light beam emitted therefrom.

When an object cutting off the light beam, for example, a finger exists on the screen 13, the irradiation light beam emitted from the light beam emission detector 11 cannot be reflected on the light beam reflecting film 12, and therefore, the light beam emission detector 11 cannot detect any reflected light beam. Consequently, the intensity of the reflected light beam detected by the light beam emission detector 11 is detected, so that the emission direction at that time, that is, an angle θL (see FIG. 2) of the object viewed from the left light beam emission detector 11 and an angle θR (see FIG. 2) of the object viewed from the right light beam emission detector 11 can be obtained based on the intensity. Moreover, a coordinate detection controller, described later, included in the coordinate detector 4 calculates the coordinates X and Y by utilizing the angles θL and θR and the width W of the screen 13 (see FIG. 2) based on the following equations, $$X = W \times \tan \theta R \div (\tan \theta L + \tan \theta R) \quad (1)$$

$$Y = H - W \times \tan \theta L \times \tan \theta R \div (\tan \theta L + \tan \theta R) \quad (2)$$

Figure 3:
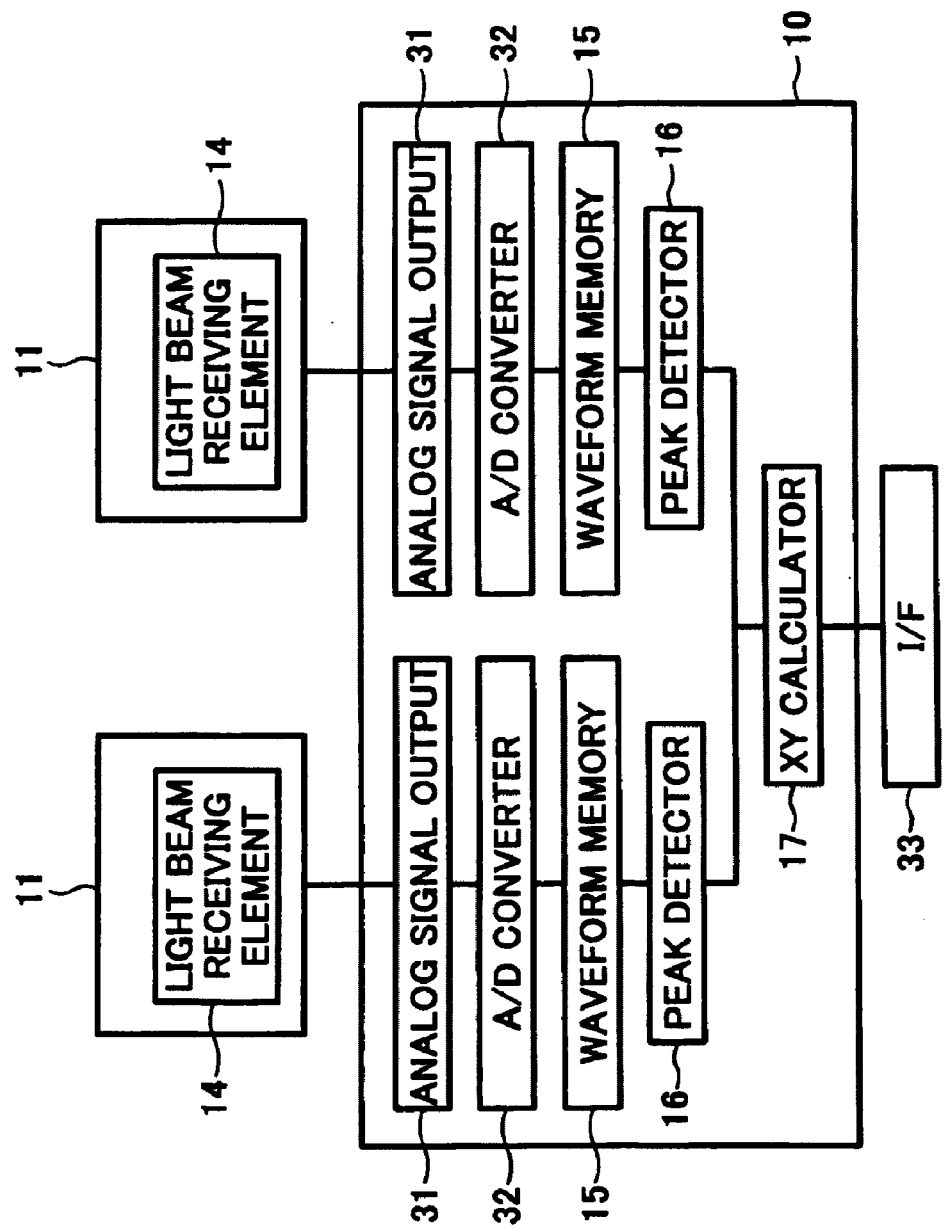
FIG. 3 is a block diagram which shows the configuration of main parts of a coordinate detection controller 10.

FIG. 3 is a block diagram which shows the functional configuration of main parts of the coordinate detection controller 10 included in the coordinate detector 4. The coordinate detection controller 10 includes analog signal outputs 31, A/D converters 32, waveform memories 15, peak detectors 16 and an xy calculator 17. The analog signal output 31 is adapted to output, in time sequence, an analog electric signal in proportion to the intensity of the light beam received by a light beam receiving element 14 contained inside of the light beam emission detector 11. In other words, the analog signal output 31 outputs the analog electric signal in an analog waveform. The A/D converter 32 converts the analog signal into a digital signal, and then, stores the digitized waveform data in the wave form memory (for example, a RAM) 15. The peak detector 16 compares the values of the waveform data stored in the waveform memory 15 in time sequence, so as to determine a cutting-off time corresponding to a timing at which the light beam is cut off by the finger or the like.

Subsequently, the xy calculator 17 determines the angles θL and θR corresponding to the cutting-off time based on the scanning speed of the irradiation light beam emitted from the light beam emission detector 11, and then, calculates the coordinates X and Y by using the equations (1) and (2). Thereafter, the xy calculator 17 outputs the calculated coordinate data to the controller 2 together with status data, described later, via an interface 33. Incidentally, the coordinate inputting/detecting device, which has been explained under the section of the Related Art, maybe used as the coordinate detector.

Figure 4:
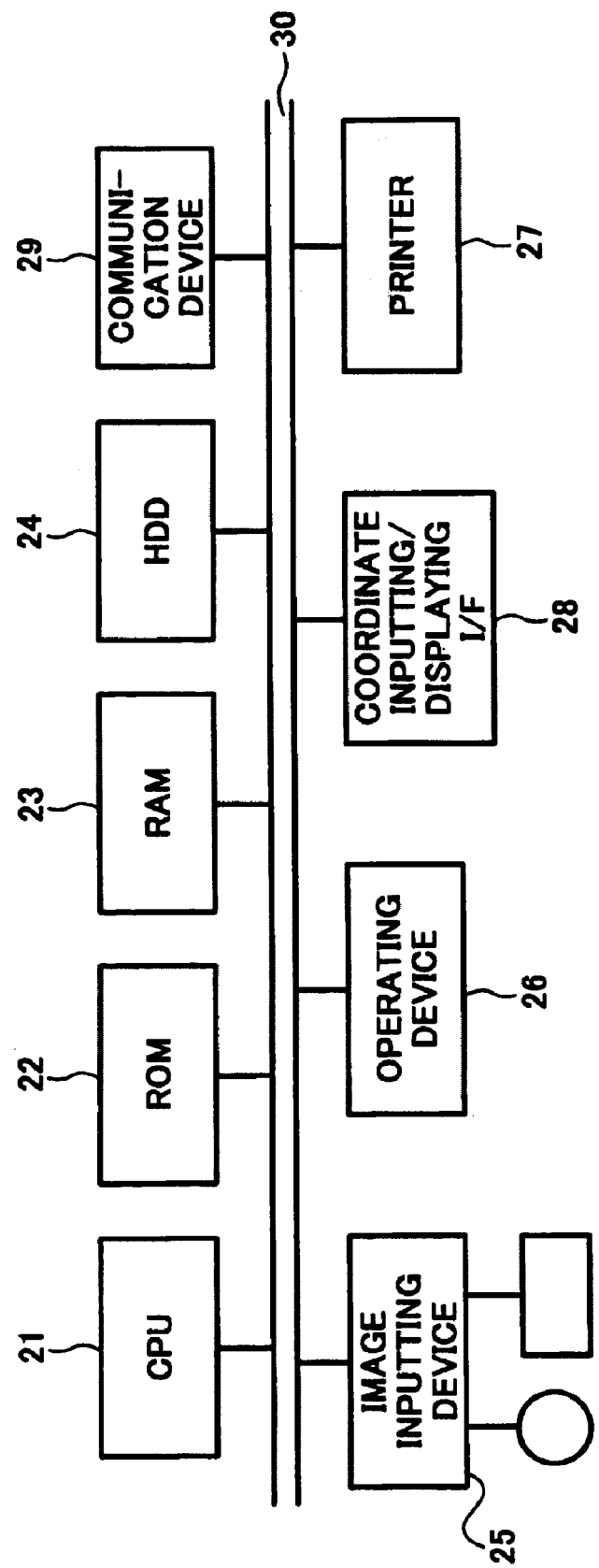
FIG. 4 is a block diagram which shows the configuration of hardware of a controller 2.

FIG. 4 is a block diagram which shows the configuration of hardware of the controller 2 in the present embodiment. As shown, the controller 2 in the present embodiment comprises, a CPU 21 which controls the entire apparatus according to programs or performs image processing, a ROM 22 which stores therein a part of the programs, a RAM 23 which temporarily stores therein another part of the programs or data, a hard disk device 24 (abbreviated as an HDD) which stores therein the programs or the data, an image inputting device 25 including a storage medium drive device which reads or writes the data from or in a detachable storage medium such as an optical disk or a floppy disk, a scanner which reads out an image formed on an original, and the like, an operating device 26 which has a keyboard or a mouse so as to input an instruction or the like from a user, a printer 27 which prints the image or the like, a coordinate inputting/displaying interface 28 which receives coordinate data from the coordinate detector 4 in the display apparatus 1 with a coordinate inputting function or transmits display data to the display processor, a communication device 29 which has a modem or a terminal device, so as to transmit or receive various kinds of information such as an image file or a program to or from, for example, a Web server on the Internet or another image processing apparatus via a line, a bus 30 which connects the sections 21 to 29 to each other in such a manner that the data can be freely transmitted or received, and the like.

The image inputting device 25 can read or write a program, various kinds of data, an image file, object data and the like. The image file input from the image inputting device 25 or the communication device 29 also is stored in a specified folder for storing an image file inside of the hard disk device (i.e., the HDD) 24.

The controller 2 subjects the image file or object data stored in the HDD 24 to a desired image processing by the CPU 21 based on the various kinds of programs or region designating data stored in the ROM 22, the RAM 23 and the HDD 24.

Figure 5:
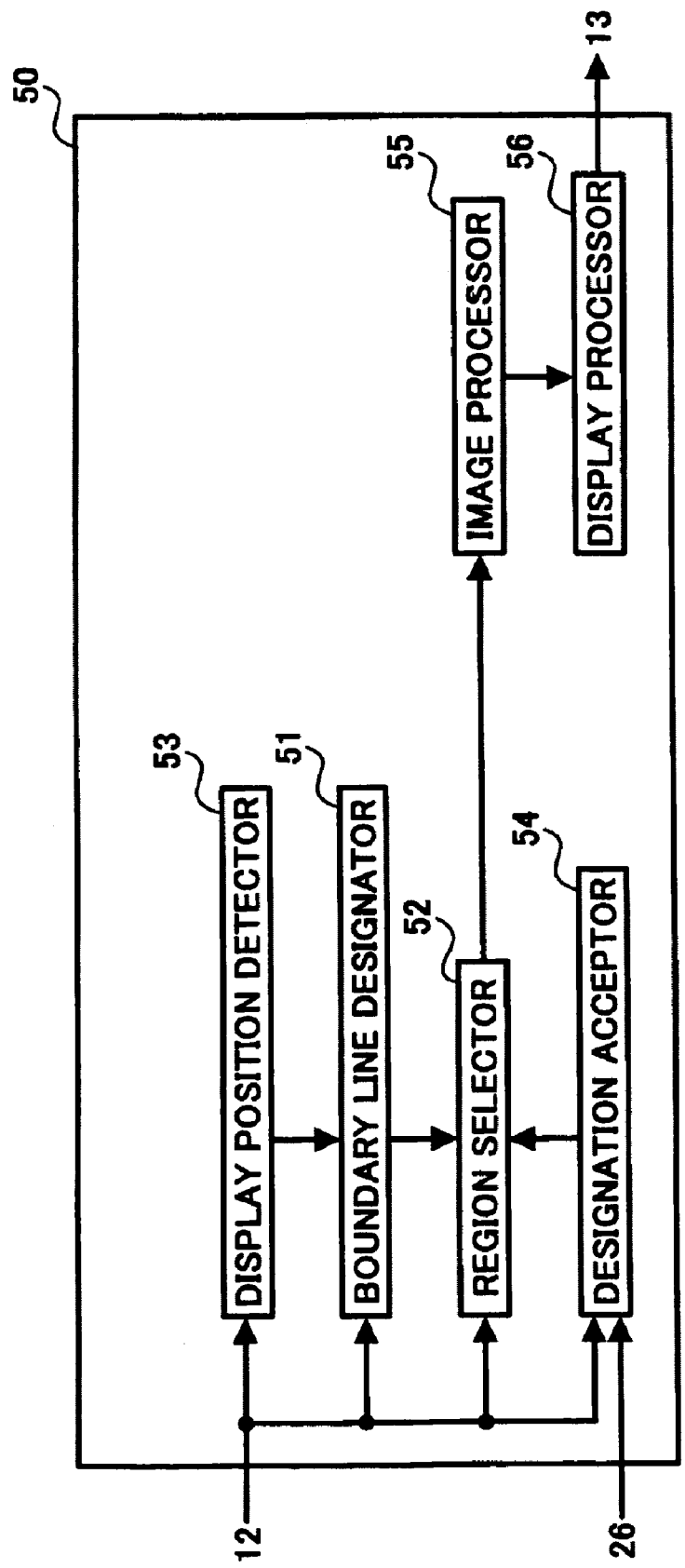
FIG. 5 is a block diagram which shows the functional configuration of a processor 50.

FIG. 5 is a functional block diagram which shows the function of a processor 50 for performing the image processing which is a feature of the present embodiment. The processor 50 includes a boundary line designator 51, a region selector 52, a display position detector 53, a designation acceptor 54, an image processor 55 and a display processor 56.

The boundary line designator 51 is adapted to designate a predetermined region on the screen 13 in the display apparatus 1 with a coordinate inputting function. Specifically, the boundary line designator 51 receives, via the coordinate detector 4, values indicating the coordinates of the position of a boundary line designated by a touch of a user on the screen 13 in the display apparatus 1 with a coordinate inputting function, and then, designates the boundary line indicated by the received values indicating the coordinates as a boundary line in a region to be processed in which an image is to be processed.

In another example, the user may designate a rectangle by a dragging operation of the mouse, and thus, the boundary line designator 51 may designate the designated rectangular region as a boundary line in a region to be processed. In this manner, the region designating method is not limited to that in the present embodiment.

The display position detector 53 is adapted to detect that an image is displayed on the boundary line designated by the boundary line designator 51. More specifically, the display position detector 53 compares the coordinates on the screen 13 indicating the boundary line with the coordinates of the image on the screen 13, and then, judges that the image is displayed on the boundary line when both of the coordinates accord with each other. Thereafter, the display position detector 53 notifies the detection result to the region selector 52.

The designation acceptor 54 is adapted to accept a designation from the user via the coordinate detector 4, the operating device 26 or the like. And then, the designation acceptor 54 sends the contents of the accepted designation to the region selector 52 and the image processor 55. The designation from the user signifies, for example, whether the image displayed on the boundary line in the region to be processed is included in the region to be processed. Otherwise, the designation from the user signifies, for example, the type of the image processing to be set with respect to the image processor 55. The type of the image processing will be explained later.

The region selector 52 is adapted to select the inside or the outside of the boundary line designated by the boundary line designator 51 as a region to be processed. More specifically, the region selector 52 determines based on information accepted from the designation acceptor 54 and the display position detector 53 whether the image displayed on the boundary line is included in the region to be processed, so as to confirm the region to be processed.

The image processor 55 is adapted to subject the image inside of the region to be processed, which is selected and confirmed by the region selector 52, to a predetermined image processing. Here, the image processings performed by the image processor 55 include the processing of deleting the image to be processed, the painting processing of displaying the image to be processed with a predetermined color, the shading processing of displaying the image with shades, the hatching processing of displaying the image with hatches, and the patterning processing of displaying a predetermined pattern inside of the image. Incidentally, the processing, to which the image processor 55 subjects the region to be processed, is determined based on the designation accepted by the designation acceptor 54. The display processor 56 is adapted to display, on the screen 13, the image after the image processing performed by the image processor 55.

Figure 6:
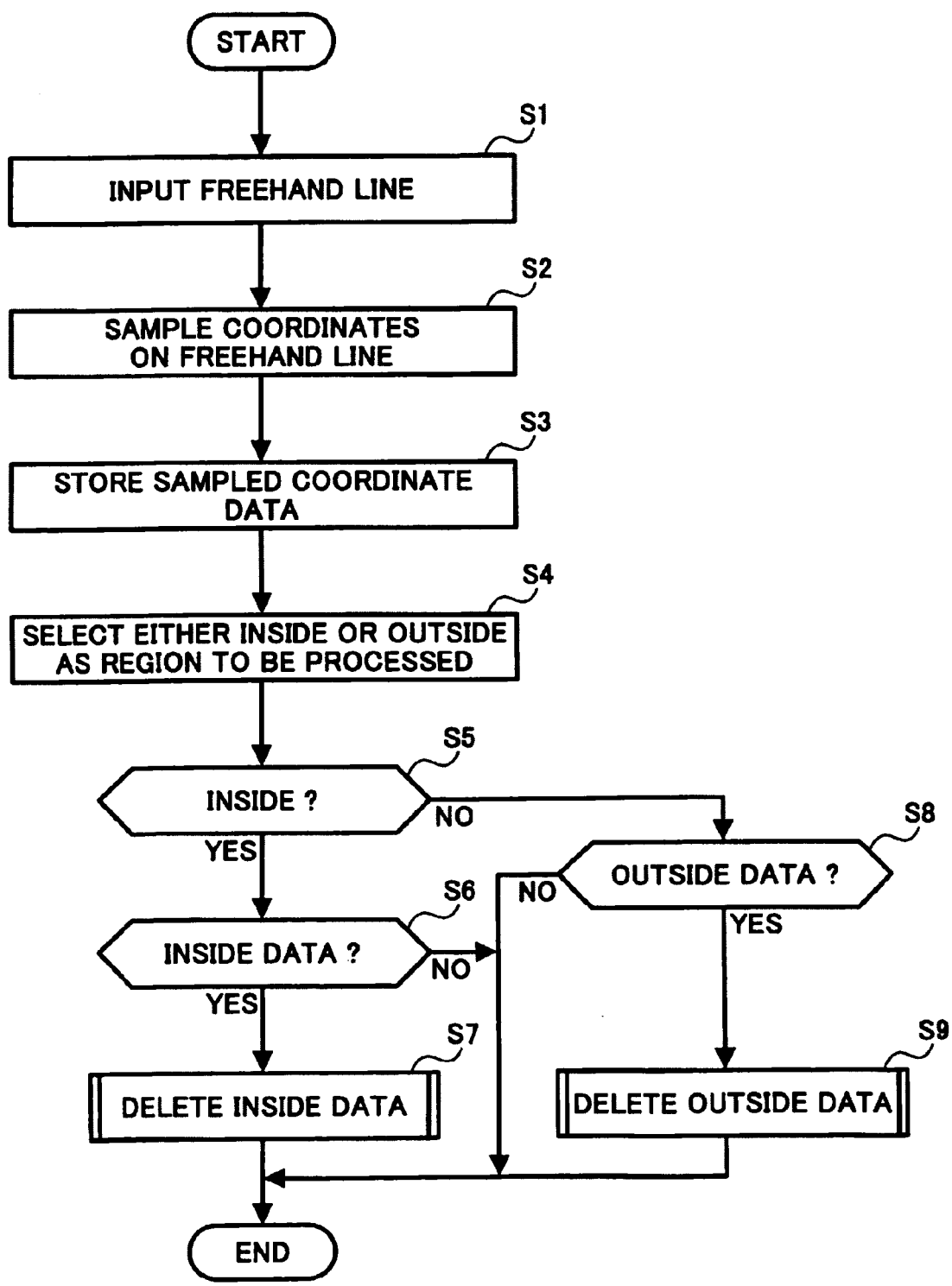
FIG. 6 is a flowchart which shows an image processing operation.

FIG. 6 is a flowchart which shows processing steps when the deleting processing is performed as one example of the image processings. First of all, according to the program, the CPU 21 fetches display data inclusive of image data on an image to be deleted from a plurality of image files stored in the hard disk device 24, and then, displays the display data on the display apparatus 1 with a coordinate inputting function. For example, the user manually draws a line with his or her finger on the screen 13, on which the display data is displayed, and thus, inputs a freehand line serving as a boundary line which determines a region in which the image is to be deleted, that is, the region to be processed (step S1). Subsequently, the CPU 21 samples a predetermined number of coordinates on the input freehand line (step S2).

Figures 7, 8:
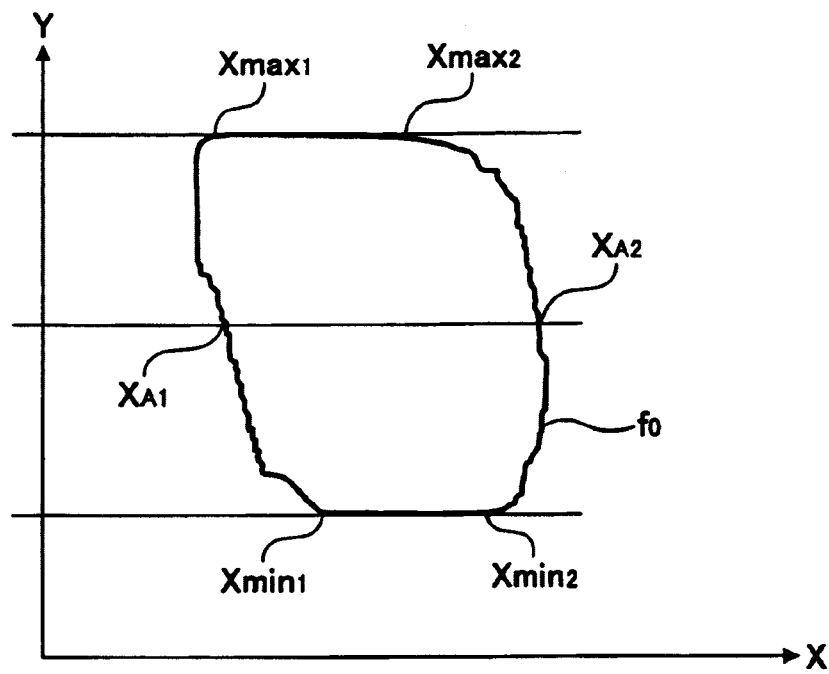
FIG. 7 is a graph which shows a freehand line input by a user.
FIG. 8 is a diagram explanatory of the coordinates of the freehand line.

FIG. 7 shows the freehand line 40 input at step S1. At step S2, the coordinates on the freehand line 40 shown in FIG. 7 are sampled.

The CPU 21 stores Y coordinates between Ymax and Ymin which are sampled and X coordinates corresponding to the Y coordinates in the RAM 23 (step S3), wherein Ymax denotes a maximum of the sampled Y coordinates, Xmax1, a maximum on the X coordinates at a point corresponding to Ymax, on the freehand line, Xmax2, a minimum of the X coordinates at the point corresponding to Ymax, Ymin, a minimum of the Y coordinates at a point constituting the freehand line, Xmin1, a maximum of the X coordinates at a point corresponding to Ymin, on the boundary line, and Xmin2, a minimum of the X coordinates at the point corresponding to Ymin. At this time, the boundary line designator 51 designates the freehand line drawn on the X and Y coordinates stored in the RAM 23 at step S3 as the boundary line in the region to be processed.

FIG. 8 shows the contents to be stored in the RAM 23. Here, XA1 and XA2 shown in FIG. 8 denote the X coordinates of the position shown in FIG. 7, that is, the X coordinates at an arbitrary point constituting the freehand line, and YA denotes the Y coordinates at the arbitrary point.

Subsequently, the region selector 52 allows the user to select the inside or the outside surrounded by the freehand line, i.e., the boundary line as the image deleting region, i.e., the region to be processed (step S4). When the user touches the inside or the outside of the displayed freehand line with his or her finger, the region selector 52 gains the coordinates of the touched position transmitted from the display apparatus 1 with a coordinate inputting function. And then, the region selector 52 selects a side inclusive of the touched position out of the inside or the outside of the freehand line as the region to be processed.

When it is judged based on the coordinates of the touched position that the inside of the freehand line is touched, the region selector 52 selects the inside of the freehand line as the region to be processed (Yes at step S5). In this case, the image processor 55 specifies the region inside of the freehand line, that is, the region to be processed by using the contents stored in the ROM 32 shown in FIG. 8, and then, judges whether there is an image such as a character or a figure in the region to be processed (step S6) In other words, the image processor 55 judges whether there is any data. If there is data (Yes at step S6), the image processor 55 deletes (or erases) the data (step S7).

The region to be processed in this case ranges from Xdel1 (Xmax1<Xdel1<Xmax2) to Xdel2 (Xmin1<Xdel2<Xmin2) and from Ymax to Ymin. Here, Xmax denotes the X coordinates in Ymax, and Xmin denotes the X coordinates in Ymin.

When it is judged based on the coordinates of the touched position that the outside of the freehand line is touched, the region selector 52 selects the outside of the freehand line as the region to be processed (No at step S5). In this case, the image processor 55 specifies the region outside of the freehand line, that is, the region to be processed by using the contents stored in the ROM 32, and then, judges whether there is any data in the region to be processed. If there is data (Yes at step S8), the image processor 55 deletes the data (step S9).

The region to be processed in this case is a region except for the region ranging from Xdel1 (Xmax1<Xdel1<Xmax2) to Xdel2 (Xmin1<Xdel2<Xmin2). That is to say, if there is any image in a region designated from Xdel3 (Xmax1>Xdel3 or Xmax2<Xdel3) to Xdel4 (Xmin1>Xdel4 or Xmin2<Xdel4), a region indicated by Xdel5 (Ymax<Xdel5) (i.e., a region above Ymax) and a region indicated by Xdel6 (Ymin>Xdel6) (i.e., a region below Ymin) (Yes at step S8), the image processor 55 deletes the data (step S9). In this way, the image deleting processing comes to an end.

As another example, at step S4, the user may select the inside or the outside of the freehand line by using the operating device 26. In this case, the region selector 52 selects a side designated by the operating device 26 as the region to be processed.

Figure 9:
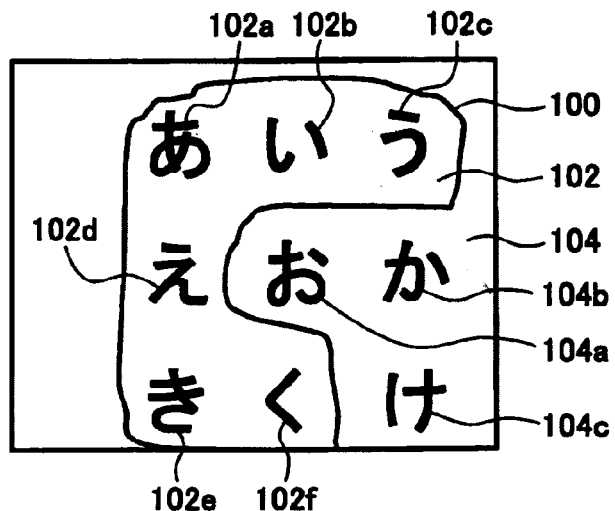
FIG. 9 is a diagram explanatory of display data inclusive of a character image and a freehand line drawn on the image based on the display data, which are displayed on a screen.
Figure 10A:
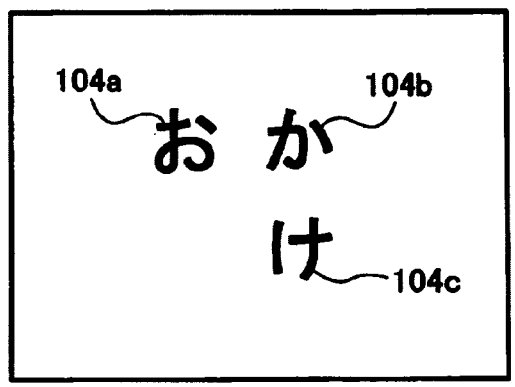
FIGS. 10A and 10B are diagrams which show the display data after image processing.
Figure 10B:
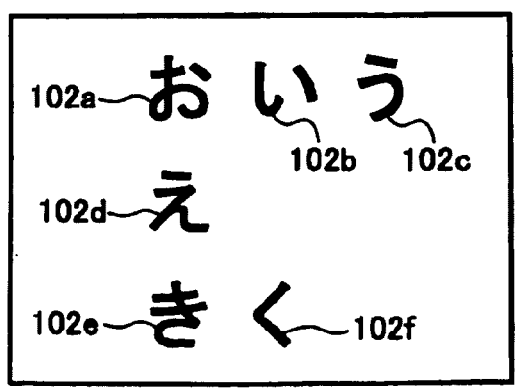

Referring to FIG. 9, the image deleting processing explained in reference to FIG. 5 will be explained more specifically. FIG. 9 shows the display data inclusive of a character image displayed on the screen 13. As shown in FIG. 9, the user inputs a freehand line 100 surrounding a plurality of character images. When the deletion is designated by drawing the freehand line 100 and the inside 102 of the freehand line 100 is selected as a region to be processed, that is, a region to be deleted, character images 102a to 102f included in the region to be processed are deleted, and as a result, only character images 104a to 104c displayed outside of the region to be processed are displayed on the screen 13, as shown in FIG. 10A. In contrast, when the outside 104 of the freehand line 100 is selected as a region to be processed, the character images 104a to 104c included in the region to be processed are deleted, and as a result, only the character images 102a to 102f displayed outside of the region to be processed are displayed on the screen 13, as shown in FIG. 10B. In this manner, it is possible to subject either one of the regions divided by the freehand line 100 to a predetermined image processing.

When the image processor 55 subjects the image selected by the region selector 52 to a shading processing, the image processor 55 performs the shading processing of the inside image and the shading processing of the outside image in place of the deleting processing of the inside image (step S7) and the deleting processing of the outside image (step S9) explained in reference to FIG. 6.

Figure 11:
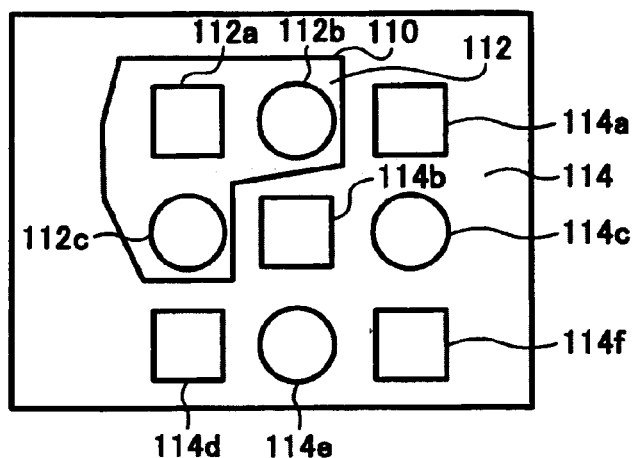
FIG. 11 is a diagram explanatory of display data inclusive of a graphic image and a freehand line drawn on the image based on the display data, which are displayed on a screen.
Figure 12A:
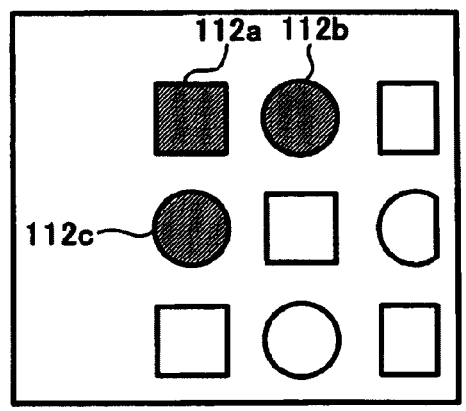
FIGS. 12A and 12B are diagrams which show display data after shading processing.
Figure 12B:
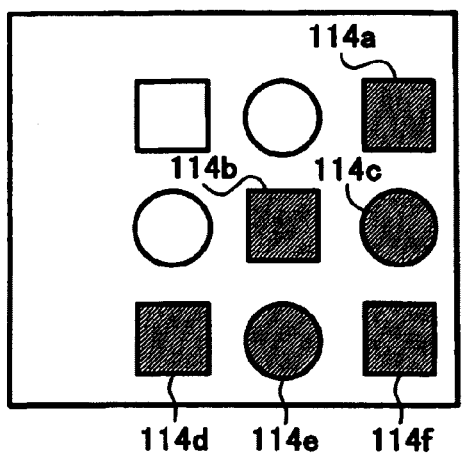

FIG. 11 shows the display data inclusive of a graphic image displayed on the screen 13. As shown in FIG. 11, the user inputs a freehand line 110 surrounding a plurality of graphic images. When the inside 112 of the freehand line 110 is selected as a region to be processed, that is, a region to be shaded, only graphic images 112a to 112c included in the region to be processed are subjected to the shading processing, and as a result, the shades are displayed inside of the graphic images 112a to 112c, as shown in FIG. 12A. In contrast, when the outside 114 of the freehand line 110 is selected as a region to be processed, only graphic images 114a to 114f included in the region to be processed are subjected to the shading processing, and as a result, the shades are displayed inside of the graphic images 114a to 114f, as shown in FIG. 12B.

When the image processor 55 subjects the image selected by the region selector 52 to a painting processing with a predetermined color, the image processor 55 performs the painting processing of the inside image and the painting processing of the outside image in place of the deleting processing of the inside image (step S7) and the deleting processing of the outside image (step S9) explained in reference to FIG. 6.

Figure 13A:
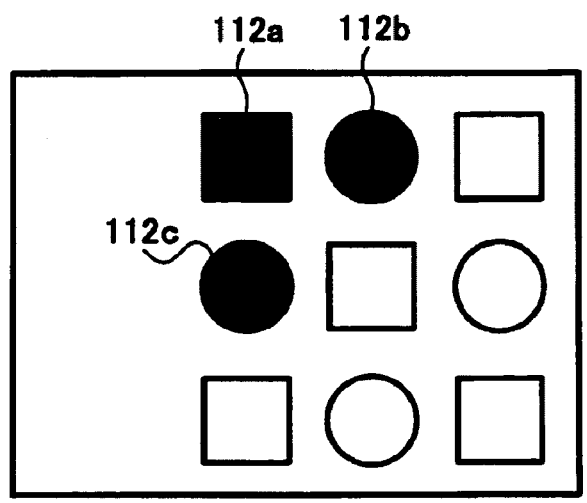
FIGS. 13A and 13B are diagrams which show display data after painting processing.
Figure 13B:
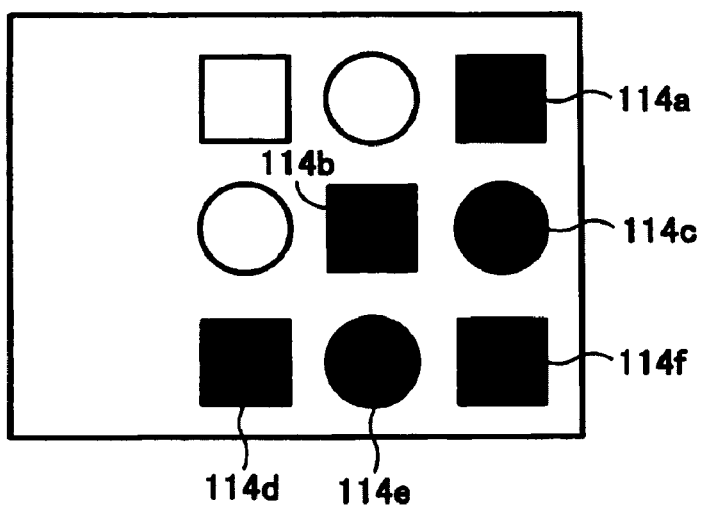

When the inside 112 of the freehand line 110 shown in FIG. 11 is selected as a region to be processed, that is, a region to be painted, only the graphic images 112a to 112c included in the region to be processed are subjected to the painting processing, and as a result, only the graphic images 112a to 112c are painted, as shown in FIG. 13A. In contrast, when the outside 114 of the freehand line 110 is selected as a region to be processed, only the graphic images 114a to 114f included in the region to be processed are subjected to the painting processing, and as a result, only the graphic images 114a to 114f are painted, as shown in FIG. 13B.

When the image processor 55 subjects the image selected by the region selector 52 to a patterning processing, the image processor 55 performs the patterning processing of the inside image and the patterning processing of the outside image in place of the deleting processing of the inside image (step S7) and the deleting processing of the outside image (step S9) explained in reference to FIG. 6.

Figure 14A:
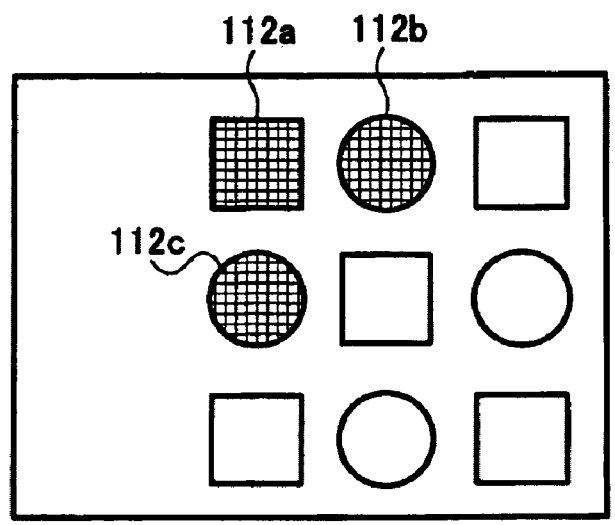
FIGS. 14A and 14B are diagrams which show display data after patterning processing.
Figure 14B:
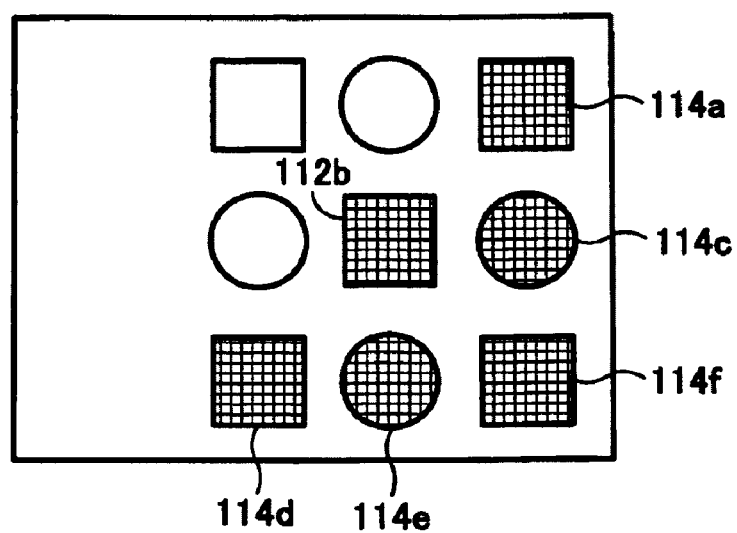

When the inside 112 of the freehand line 110 shown in FIG. 11 is selected as a region to be processed, that is, a region to be patterned, only the graphic images 112a to 112c included in the region to be processed are subjected to the patterning processing, and as a result, only the graphic images 112a to 112c are patterned, as shown in FIG. 14A. In contrast, when the outside 114 of the freehand line 110 is selected as a region to be processed, only the graphic images 114a to 114f included in the region to be processed are subjected to the patterning processing, and as a result, only the graphic images 114a to 114f are patterned, as shown in FIG. 14B.

Figure 15:
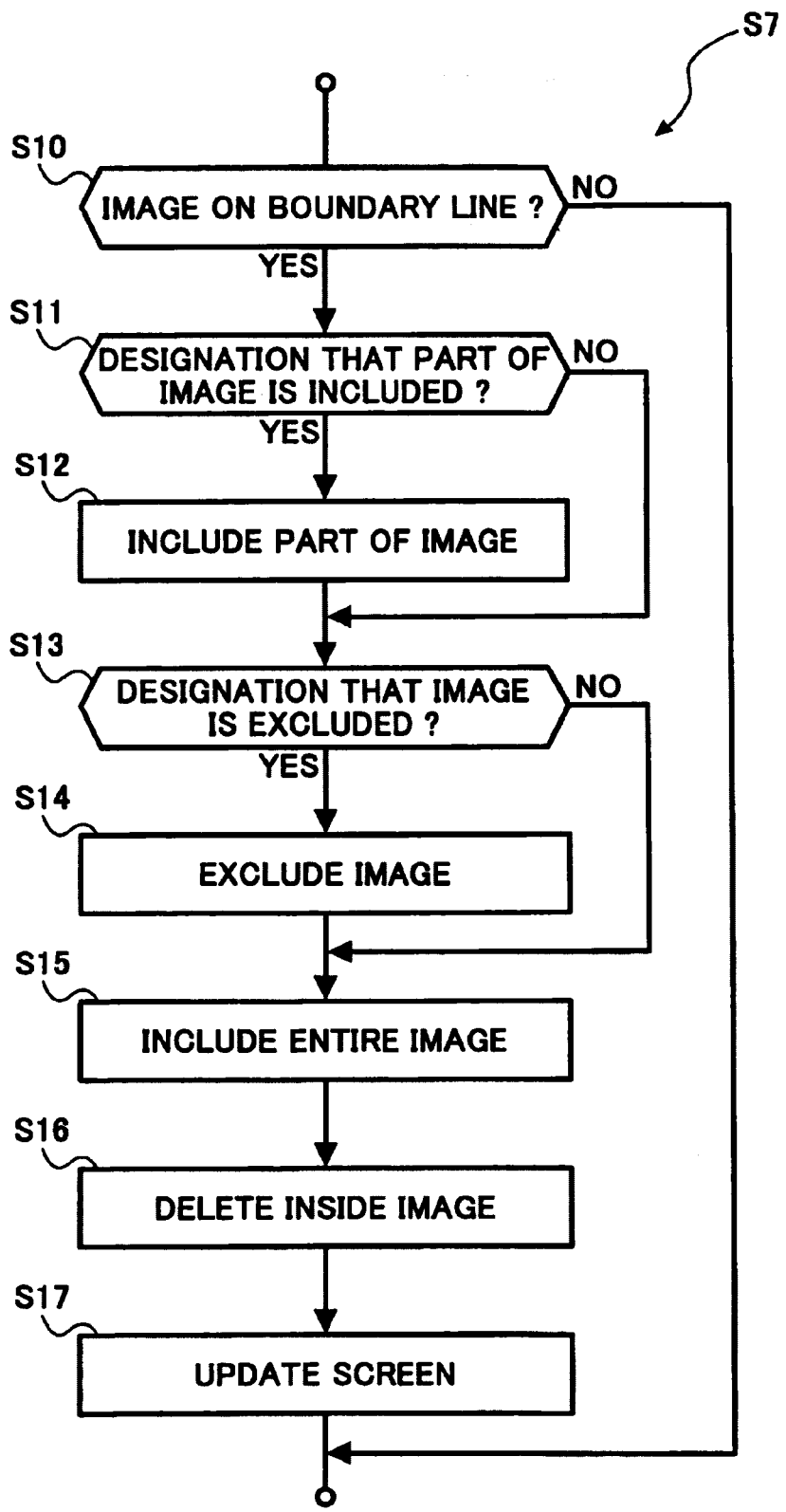
FIG. 15 is a flowchart which shows a detailed processing operation in inside data deleting processing (step S7) in the image processing explained in reference to FIG. 6.
Figure 16:
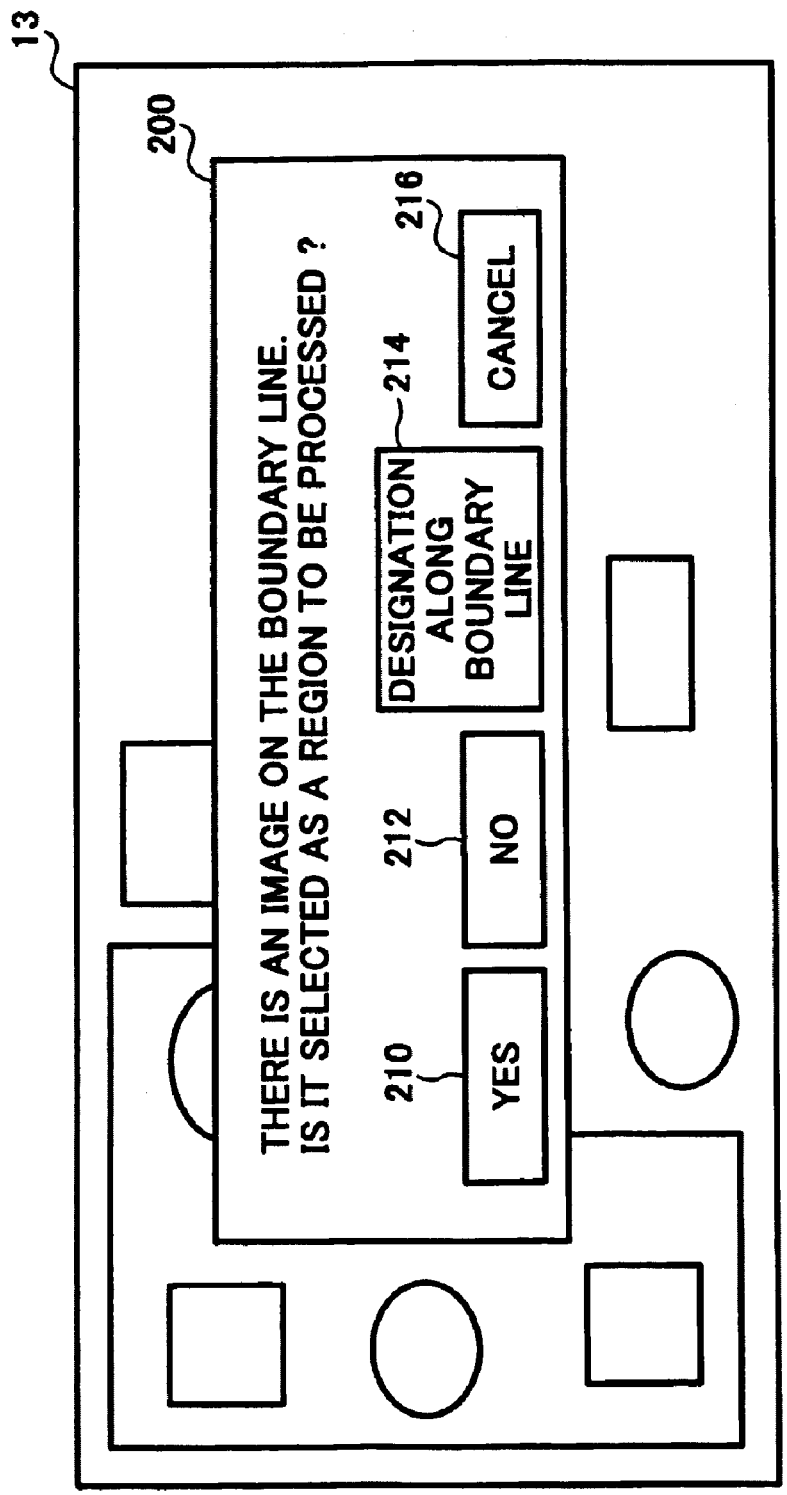
FIG. 16 is a diagram which shows display contents displayed on the screen.

Referring to FIGS. 15 and 16, the details of the inside data deleting processing in the image deleting processing explained in reference to FIG. 6 will be explained below. FIG. 15 is a flowchart which shows detailed processing steps in the inside data deleting processing (step S7), and FIG. 16 is a diagram which shows display contents displayed on the screen 13 during this processing. First of all, when the region designator 51 designates the freehand line, the display position detector 53 judges whether the image is displayed on the designated boundary line. When the display position detector 53 detects that the image is displayed on the boundary line (Yes at step S10), the display processor 56 allows a dialog box 200 shown in FIG. 16 to be displayed on the screen 13. Here, the user can determine whether the image on the boundary line is to be processed, that is, the image on the boundary line is selected as the region to be processed. When the user depresses a button 214 of "designation along boundary line", the designation acceptor 54 accepts the designation that a part of the image is selected as the region to be processed (Yes at step S11), and then, the region selector 52 selects a part included inside of the region to be processed at the image having the freehand line drawn thereon, that is, a part inside of the boundary line as the region to be processed (step S12). Namely, the region to be processed having the freehand line as the boundary is determined as the region to be processed by the image processor 55 irrespective of the image displayed on the freehand line.

When the user depresses a button 212 of "No" in the dialog box 200, the designation acceptor 54 accepts the designation that the image is excluded from the region to be processed (Yes at step S13), and then, the region selector 52 determines, as the region to be processed by the image processor 55, a part except for the image on the freehand line in the region to be processed having the freehand line as the boundary.

When the user depresses a button 210 of "Yes" in the dialog box 200, the designation acceptor 54 accepts the designation that the entire image data is selected as the region to be processed. When the user depresses a button 216 of "Cancel", the designation acceptor 54 does not accept any designation information. In the case (i.e., No at step S11 or No at step S13), the region selector 52 selects the entire image on the freehand line as the region to be processed (step S15). In other words, the region selector 52 determines the region inclusive of the image on the freehand line as the region to be processed irrespective of the boundary defined by the freehand line.

The image processor 55 deletes the image data drawn in the region to be processed determined in the processing (step S16), and then, the display processor 56 updates the region to be processed displayed on the screen 13 to a region to be processed after the deleting processing (step S17).

In this manner, it is possible to determine based on the designation by the user whether the image data on the boundary line is included in the region to be processed. Incidentally, the default in the present embodiment is designed such that the entire image data on the boundary line is included in the region to be processed if there is no designation by the user. The default in another example may be designed such that only the image data inside of the region to be processed out of the image data displayed on the boundary line is included, and alternatively, the default in a further example may be designed such that the image data displayed on the boundary line is excluded from the region to be processed.

Although it is determined whether the image on the boundary line is included in the region to be processed after the freehand line is designated as the boundary line in the present embodiment, such determination may be registered as basic setting in a still further example. Consequently, it is possible to save the user from having to determine whether the image on the boundary line is included every time the boundary line is designated. In this manner, the timings of the designation of the boundary line and the determination as to whether the image on the boundary line is included are not limited to those in the present embodiment.

Figure 17:
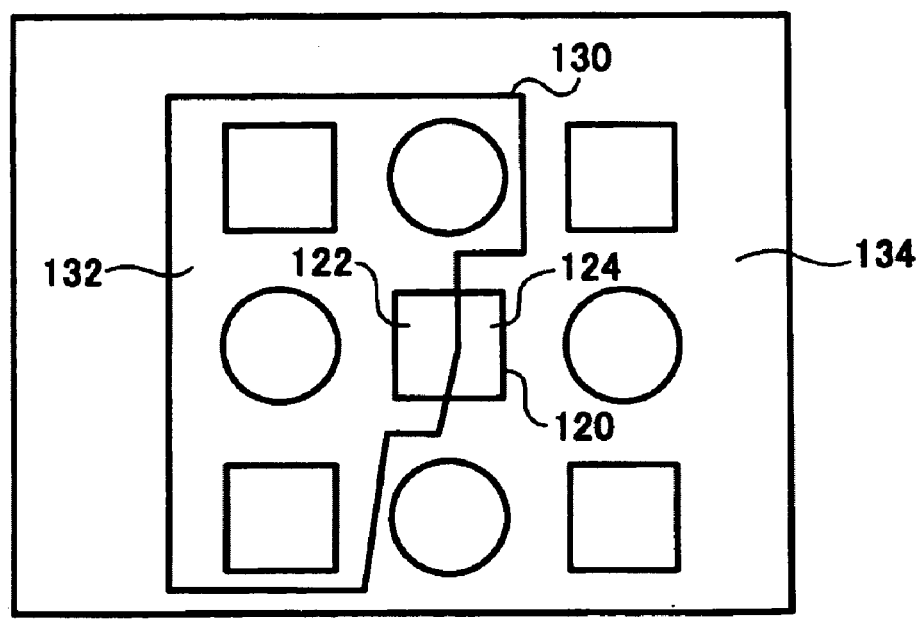
FIG. 17 is a diagram which shows a freehand line drawn on an image displayed on the screen.

The processing of the image on the boundary line when the processing of the image processor 55 is set to the deleting processing will be more specifically explained in reference to FIG. 17. FIG. 17 shows a freehand line 130 drawn on an image in an overlapping manner. That is to say, one character or one figure (a continuous figure or a continuous image) is displayed astride the inside 132 and outside 134 of the freehand line 130. In FIG. 17, a square image 120 is displayed in a manner overlapping with the freehand line 130.

Figure 18A:
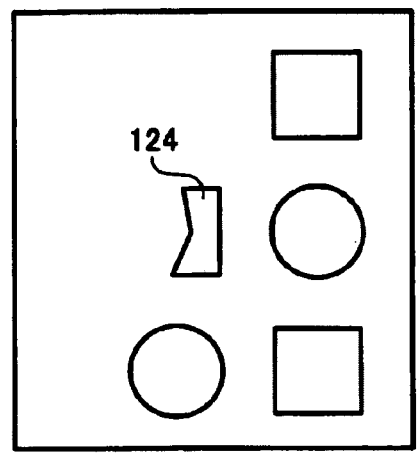
FIGS. 18A to 18C are diagrams which show display data after the image processing.

When only a part included in a region to be processed out of the image displayed on the boundary line 130 is determined as the region to be processed, a part 122 included in the region to be processed is deleted out of the square image 120, so that only the residual part 124 is displayed, as shown in FIG. 18A.

Figure 18B:
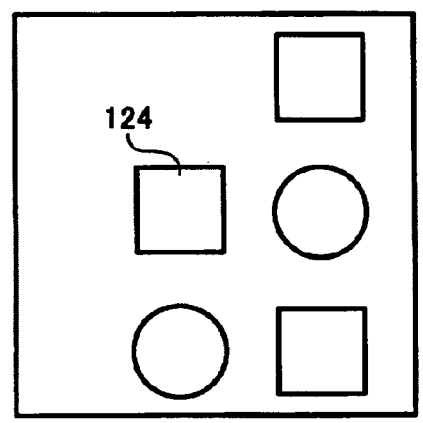

When the image displayed on the boundary line 130 is excluded from the region to be processed, the square image 120 displayed on the boundary line 130 is excluded from the region to be processed in FIG. 17, so that the entire square image 120 is displayed, as shown in FIG. 18B.

Figure 18C:
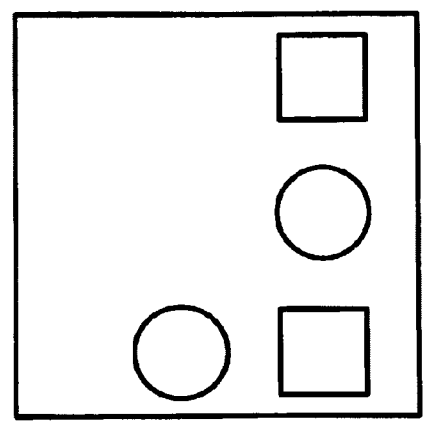

When the entire image displayed on the boundary line 130 is determined as the region to be processed, the square image 120 displayed on the boundary line 130 in FIG. 17 is included in the region to be processed, so that the square image 120 is deleted together with the residual image included in the region to be processed, as shown in FIG. 18C.

When the image processor 55 performs processings other than the deleting processing, the shading processing, the painting processing or the patterning processing is performed in place of the inside image deleting processing (step S16) explained in reference to FIG. 15.

The detailed processing step in the processing of deleting the data outside of the freehand line (step S9) explained in reference to FIG. 6 is the same as the detailed processing step in the processing of deleting the data inside of the freehand line (step S7) explained in reference to FIG. 16.

The processing in the display apparatus with the touch panel is stored in a file of an installable format or an executable format in a recording medium such as a CD-ROM, a floppy disk (FD) or a DVD which can be accessed by a computer. Furthermore, a program for use in executing the image processing in the present embodiment may be configured such that it is stored in a computer connected to a network such as the Internet, and thus, is provided by loading down via the network. The program in the present embodiment is read from the recording medium and executed in the display apparatus with the touch panel, so that it is loaded on a main storage device, and thus, each of the parts explained in the software configuration can be generated on the main storage device.

Although the electronic whiteboard system 3 embodying the display apparatus with the touch panel has been explained above, the image processing in the electronic whiteboard system 3 can be performed in the same manner also in an image processing apparatus such as a personal computer having a display device generally used. In this case, a region may be designated or other designations may be accepted by inputting via a user interface such as a keyboard or a mouse in place of the touch panel.

The other hardware configuration, software configuration and functions in the image processing apparatus are the same as those in the electronic whiteboard system 3 in the present embodiment.

As described above, in the present embodiment, the desired region can be easily designated, and then, can be readily subjected to the image processing.

It is possible to readily designate the region to be processed with ease as the user desires, so as to readily subject the desired region to the image processing.

The user can freely designate the boundary line irrespective of the position of the image displayed on the screen. Consequently, it is possible to readily subject the desired region to the image processing.

The user can determine a region more suitable for the desire of the user as the region to be processed. That is to say, it is possible to more easily designate the region to be processed with respect to the image processing more as the user desires.

The user can freely designate the boundary line irrespective of the position of the image displayed on the screen. Furthermore, even if it is difficult to draw the boundary line between the images since the images are arranged close to each other, only the desired image can be included in the region to be processed by forming the boundary line at the position overlapping with the desired image. In this manner, it is possible to more easily designate the region to be processed with respect to the image processing.

The user can determine a region more suitable for the desire of the user as the region to be processed. That is to say, it is possible to easily designate the region to be processed with respect to the image processing as the user desires.

The user can freely designate the boundary line irrespective of the position of the image displayed on the screen. Furthermore, even if it is difficult to draw the boundary line between the images since the images are arranged close to each other, the desired image can be easily included in the region to be processed by forming the boundary line outside of a desired image. In this manner, it is possible to more easily designate the image to be processed with respect to the image processing.

The user can determine a region more suitable for the desire of the user as the region to be processed. That is to say, it is possible to easily designate the region to be processed with respect to the image processing as the user desires.

Since the user can easily designate the region which is to be subjected to the image processing, user can readily perform the image processing with respect to the desired region.

It is possible to easily delete the image displayed in the desired region to be processed.

It is possible to perform the image processing in such a manner that the image displayed in the desired region to be processed is displayed in a manner painted with a desired color.

It is possible to perform the image processing in such a manner that the image displayed in the desired region to be processed is displayed in a shaded manner.

It is possible to perform the image processing in such a manner that the image displayed in the desired region to be processed is displayed in a hatched manner.

It is possible to perform the image processing in such a manner that the image displayed in the desired region to be processed is displayed in a patterned manner.

The present document incorporates by reference the entire contents of U.S. application Ser. No. 09/307,809 filed in USA on May 10, 1999, Japanese priority documents, 2001-279832 filed in Japan on Sep. 14, 2001 and 2002-266058 filed in Japan on Sep. 11, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
   a boundary line designating unit which designates a boundary line for dividing a screen into at least first and second selectable regions each containing an image to be processed, the first region being inside of the boundary line and the second region being outside of the boundary line;
   a region selecting unit which allows a user to arbitrarily select either one of the first and second selectable regions designated by the boundary line designating unit as a selected region to be processed in which an image is to be processed;
   an input accepting unit which receives a user's input of positioning of the boundary line which the user arbitrarily designates irrespective of a position of the image displayed on the screen; and
   a display position detecting unit configured to detect that the image is displayed on the boundary line designated by the boundary line designating unit,
   wherein when the display position detecting unit detects that the image is displayed on the boundary line, the region selecting unit selects a part of the image displayed on the boundary line excluded from the region to be processed as the region to be processed.

2. The image processing apparatus according to claim 1, wherein the input accepting unit accepts an input of a freehand line by the user, wherein the boundary line designating unit designates the freehand line accepted by the input accepting unit as the boundary line.

3. The image processing apparatus according to claim 1, further comprising:
   a display position detecting unit which detects that the image is displayed on the boundary line designated by the boundary line designating unit,
   wherein when the display position detecting unit detects that the image is displayed on the boundary line, the region selecting unit selects the inside of the boundary line included inside of the region to be processed out of the image as the region to be processed.

4. The image processing apparatus according to claim 3, further comprising:
   a designation accepting unit which accepts the designation that the inside of the boundary line out of the image displayed on the boundary line is selected as the region to be processed,
   wherein when the display position detecting unit detects that the image is displayed on the boundary line and the designation accepting unit accepts the designation that the inside of the boundary line out of the image is selected as the region to be processed, the region selecting unit selects the inside of the boundary line as the region to be processed.

5. The image processing apparatus according to claim 1, further comprising:
   a display position detecting unit which detects that the image is displayed on the boundary line designated by the boundary line designating unit,
   wherein when the display position detecting unit detects that the image is displayed on the boundary line, the region selecting unit selects the entire image displayed on the boundary line as the region to be processed.

6. The image processing apparatus according to claim 5, further comprising:
   a designation accepting unit which accepts the designation that the entire image displayed on the boundary line is selected as the region to be processed,
   wherein when the display position detecting unit detects that the image is displayed on the boundary line and the designation accepting unit accepts the designation that the entire image is selected as the region to be processed, the region selecting unit selects the entire image as the region to be processed.

7. The image processing apparatus according to claim 1, further comprising:
   a designation accepting unit which accepts the designation that the image displayed on the boundary line is excluded from the region to be processed,
   wherein when the display position detecting unit detects that the image is displayed on the boundary line and the designation accepting unit accepts the designation that the image displayed on the boundary line is excluded from the region to be processed, the region selecting unit selects the region of the image excluded from the region to be processed as the region to be processed.

8. The image processing apparatus according to claim 1, further comprising:
   an image processing unit which performs the image processing with respect to the region to be processed selected by the region selecting unit.

9. The image processing apparatus according to claim 8, wherein the image processing unit deletes the image displayed in the region to be processed.

10. The image processing apparatus according to claim 8, wherein the image processing unit performs a painting processing with a predetermined color with respect to the image displayed in the region to be processed.

11. The image processing apparatus according to claim 8, wherein the image processing unit performs a shading processing with respect to the image displayed in the region to be processed.

12. The image processing apparatus according to claim 8, wherein the image processing unit performs a hatching processing with respect to the image displayed in the region to be processed.

13. The image processing apparatus according to claim 8, wherein the image processing unit performs a patterning processing with respect to the image displayed in the region to be processed.

14. A display apparatus with a touch panel which controls an image displayed on a screen, the display apparatus with a touch panel comprising:

a boundary line designating unit which designates a boundary line for dividing the screen into at least first and second selectable regions based on the coordinates of a position input by the use of a touch panel, each of the first and second selectable portions containing an image to be processed, the first region being inside of the boundary line and the second region being outside of the boundary line;

a region selecting unit which allows a user to arbitrarily select either of the first and second selectable regions designated by the boundary line designating unit as a selected region to be processed in which an image is to be processed;

an input accepting unit which receives a user's input of positioning of the boundary line which the user arbitrarily designates irrespective of a position of the image displayed on the screen; and a display position detecting unit configured to detect that the image is displayed on the boundary line designated by the boundary line designating unit, wherein when the display position detecting unit detects that the image is displayed on the boundary line, the region selecting unit selects a part of the image displayed on the boundary line excluded from the region to be processed as the region to be processed.

15. An image processing method in which an image displayed on a screen is processed, the image processing method comprising:

designating a boundary line which divides the screen into at least first and second selectable regions each containing an image to be processed, the first region being inside of the boundary line and the second region being outside of the boundary line;

allowing a user to arbitrarily select either one of the first and second selectable regions designated at the region designating as a selectable region to be processed in which an image is to be processed;

receiving a user's input of positioning of the boundary line which the user arbitrarily designates irrespective of a position of the image displayed on the screen; and detecting a display position to detect that the image is displayed on the boundary line designated by said designating a boundary line, wherein when said detecting detects that the image is displayed on the boundary line, a part of the image displayed on the boundary line excluded from the region to be processed is selected as the region to be processed.

16. A program for allowing a computer to execute an image processing by which an image displayed on a screen is processed, the program for allowing a computer to execute:

designating a boundary line which divides the screen into at least first and second selectable regions each containing an image to be processed, the first region being inside of the boundary line and the second region being outside of the boundary line;

allowing a user to arbitrarily select either one of the first and second selectable regions designated at the region designating as a selectable region to be processed in which an image is to be processed; and receiving a user's input of positioning of the boundary line which the user arbitrarily designates irrespective of a position of the image displayed on the screen; and detecting a display position to detect that the image is displayed on the boundary line designated by said designating a boundary line, wherein when said detecting detects that the image is displayed on the boundary line, a part of the image displayed on the boundary line excluded from the region to be processed is selected as the region to be processed.

* * * * *